United States Patent [19]

Alpers

[11] 3,876,308
[45] Apr. 8, 1975

[54] AUTOMATIC COMMAND GUIDANCE SYSTEM USING OPTICAL TRACKERS

[75] Inventor: Frederick C. Alpers, Riverside, Calif.

[73] Assignee: The United States of America as represented by the Secretary of the Navy, Washington, D.C.

[22] Filed: May 24, 1971

[21] Appl. No.: 148,257

[52] U.S. Cl. .......... 356/152; 178/6.8; 178/DIG. 21; 250/203 CT; 244/3.16
[51] Int. Cl. .................. F41g 11/00; G01b 11/26
[58] Field of Search .......... 244/3.16, 3.19, 3.13, 14; 250/203 R, 203 CT; 178/DIG. 21, 7.2; 356/152

[56] References Cited
UNITED STATES PATENTS 3,098,933  7/1963  Barasch .................. 250/203 R
3,366,735  1/1968  Hecker ................. 178/DIG. 21
3,733,133  5/1973  Chapman ................... 356/152

Primary Examiner—Maynard R. Wilbur
Assistant Examiner—S. C. Buczinski
Attorney, Agent, or Firm—Richard S. Sciascia; Joseph M. St. Amand

[57] ABSTRACT

This invention comprises a missile guidance system wherein an automatic electro-optical tracking device is used to track a target and a second electro-optical tracking device, which shares certain components with the first device, is used to acquire and track the missile; by using angular position data from these two devices, a simple computer determines the course corrections necessary to bring the missile into line with the target before impact; and an optical command link is used to transmit these course corrections to the missile to complete the control loop.

9 Claims, 11 Drawing Figures

FREDERICK C. ALPERS
INVENTOR.

BY
ATTORNEY

FREDERICK C. ALPERS
INVENTOR.

BY
ATTORNEY

FREDERICK C. ALPERS
INVENTOR.

BY *J. M. St. Amand*

ATTORNEY

FREDERICK C. ALPERS
INVENTOR.

ATTORNEY

DUAL REFRACTIVE LENS ARRANGEMENT

ARRANGEMENT INVOLVING A CASSEGRAINIAN REFLECTOR

AUTOMATIC COMMAND GUIDANCE SYSTEM USING OPTICAL TRACKERS

BACKGROUND OF THE INVENTION

1. Field of the Invention

The present invention relates to automatic command guidance systems and more particularly to automatic command guidance systems which will cause a missile to be command guided to a target by use of optical tracking techniques.

2. Description of the Prior Art

One of the basic capabilities required for aircraft used in modern day warfare is an attack capability against tactical surface targets, i.e., bridges, tanks, revetted guns, etc. This capability was provided by bombing systems during World War II and the Korean War; subsequently, a more accurate system was developed in the form of a radio-link-controlled missile, in which the control signals are initiated manually by the pilot. To determine which (if any) control signals are desired, the pilot visually observes the target, and, aided by a highly monochromatic flare carried in the tail of the missile, observes the relative angular position of the missile. He then manipulates his remote control stick to bring the missile to the target line of sight and to maintain it there as the missile, followed by the aircraft, closes on the target. However, with the emergence of improved anti-aircraft guns, particularly the radar-controlled 57-mm anti-aircraft gun, the aircraft attrition rate against a defended target would be severe if the present missile-following system were used at the close approach ranges which are required to obtain maximum terminal accuracy. By increasing the range at which the missile is launched, the aircraft falls further behind the missile and the attrition rate can be reduced, but this also considerably reduces the system accuracy. Earlier systems also used active conically scanned radar or complex electro-optical correlators that had no capability for tracking a target and missile simultaneously.

SUMMARY OF THE INVENTION

This invention provides an improved automatic command guidance system for missiles against enemy tactical targets which relieves the pilot of controlling the flight of the missile and thereby reduces special skill training requirements and permits delivery of a missile from a greater stand-off range than is possible with conventional systems and without reduction in terminal accuracy.

In this system two automatic electro-optical tracking devices sharing some components are used to track both a missile and target. Using data from both tracker devices a simple computer determines course corrections and an optical command link is used to transmit the course corrections to the missile to direct it for collision with the target.

STATEMENT OF THE OBJECTS OF THE INVENTION

The primary object of the invention is to provide an automatic command guidance system which by optical means tracks both missile and target for increased reliability of the system.

Other objects and many of the attendant advantages of this invention will become readily appreciated as the same becomes better understood by reference to the following detailed description when considered in connection with the accompanying drawings.

DESCRIPTION OF THE PREFERRED EMBODIMENT

Figure 1:
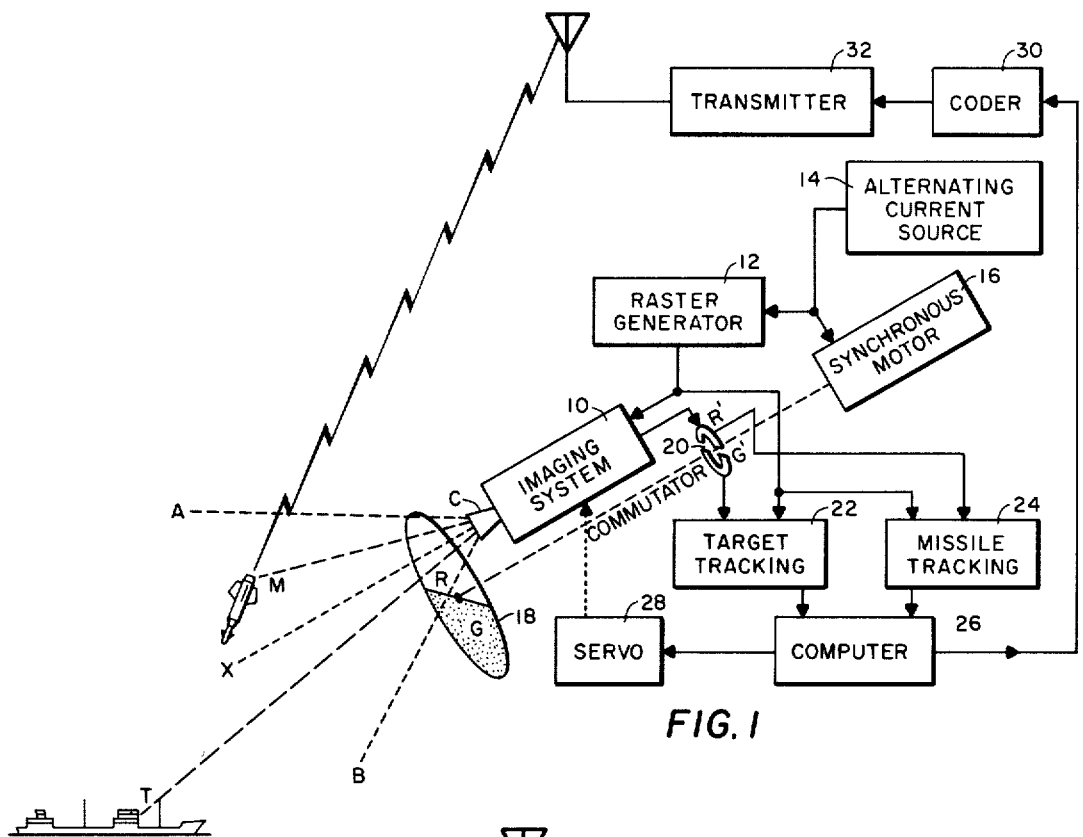
FIG. 1 is a block diagram of a preferred embodiment of the invention.

Referring now to the drawings, there is shown in FIg. 1 an imaging system 10 viewing a scene bounded by angle ACB, which supplies electronic signals containing information regarding the position of the target, T, and the missile, M, with respect to its axes of orientation, CX. Imaging system 10 generally operates in the same manner as the conventional television camera and utilizes an imaging tube such as the vidicon or image orthicon. Typically, imaging system 10 would be scanned with a conventional television-type raster and would then provide video signals to subsequent electronic circuitry.

These video signals will pertain to the target and also to other objects because, as is shown in FIG. 1, the field of view (angle ACB) of imaging system 10 is wide enough that objects other than the target, T, can simultaneously be viewed. The optical system associated with imaging system 10 should be focused at infinity, which places all objects beyond one hundred feet in sharp focus. As is shown in FIG. 1, missile M is launched with a heading such that it is propelled into field of view ACB, and it will quickly attain a separation of more than one hundred feet from imaging system 10 and will then be in view and in focus. As the missile separates farther from the imaging system and approaches the target, a bright highly-monochromatic flare (chemically powered) or optical beacon (electrically powered) carried by the missile serves to keep the missile visible and readily identified. (Otherwise the missile soon appears too small to be seen.)

Raster generator 12 supplies the scan voltage to provide the proper raster for the camera of imaging system 10. As is the case with conventional television systems, raster generator 12 is synchronized by an alternating current source, 14, which might for example, be a 115 volt, 60 cycle power line. A synchronous motor 16 is powered by the same alternating current source 14, and is thereby made to operate synchronously with raster generator 12. The windings or gearing within the synchronous motor are designed to make the output shaft of the motor turn through 180° while one full raster is being generated by raster generator 12. Synchronous motor 16 rotates an optical filter disc 18 and a commutator 20. The filter disc is divided into two 180° segments, G and R, which alternate in filtering the light entering imaging system 10. Similarly, the commutator is divided into two 180° segments, G' and R', which commutate the video signals from imaging system 10 into two separate channels in correspondence with the alternating of the filter segments G and R. By selecting one segment, G, of filter disc 18 to be a filter which rejects the highly monochromatic light from the missile beacon or flare, but allows most other colors to pass through, the video signals that reach commutator segment G' relate only to objects other than the missile beacon or flare that appear within the field of view. Similarly, by selecting the other filter segment, R, to be one which passes only the highly monochromatic light from the beacon or flare and rejects other colors, the video signals that reach commutator segment R' relate primarily to the light given off by the beacon or flare.

By the commutation means described above, the video signals associated with successive scanning rasters of imaging system 10 are fed alternately to target tracking circuit 22 and missile tracking circuit 24; that is, video information pertaining to one field or frame of scanning by imaging system 10 is fed via commutator segment G' to target tracking circuit 22, while that for the next field or frame is fed via segment R' to missile tracking circuit 24. Furthermore, the signals entering the target tracking circuit pertain to all portions of the scene viewed less the missile beacon or flare, while those entering the missile tracker pertain primarily to the beacon or flare. Target tracking circuit 22 and missile tracking circuit 24 may be of the type shown and described in my co-pending application, Ser. No. 79,469 filed 29 Dec. 1960, now U.S. Pat. No. 3,711,639, for a Television Target Tracking System. For synchronizing purposes described in the referenced application, signals from raster generator 12 are also supplied to tracking circuits 22 and 24.

Figure 2:
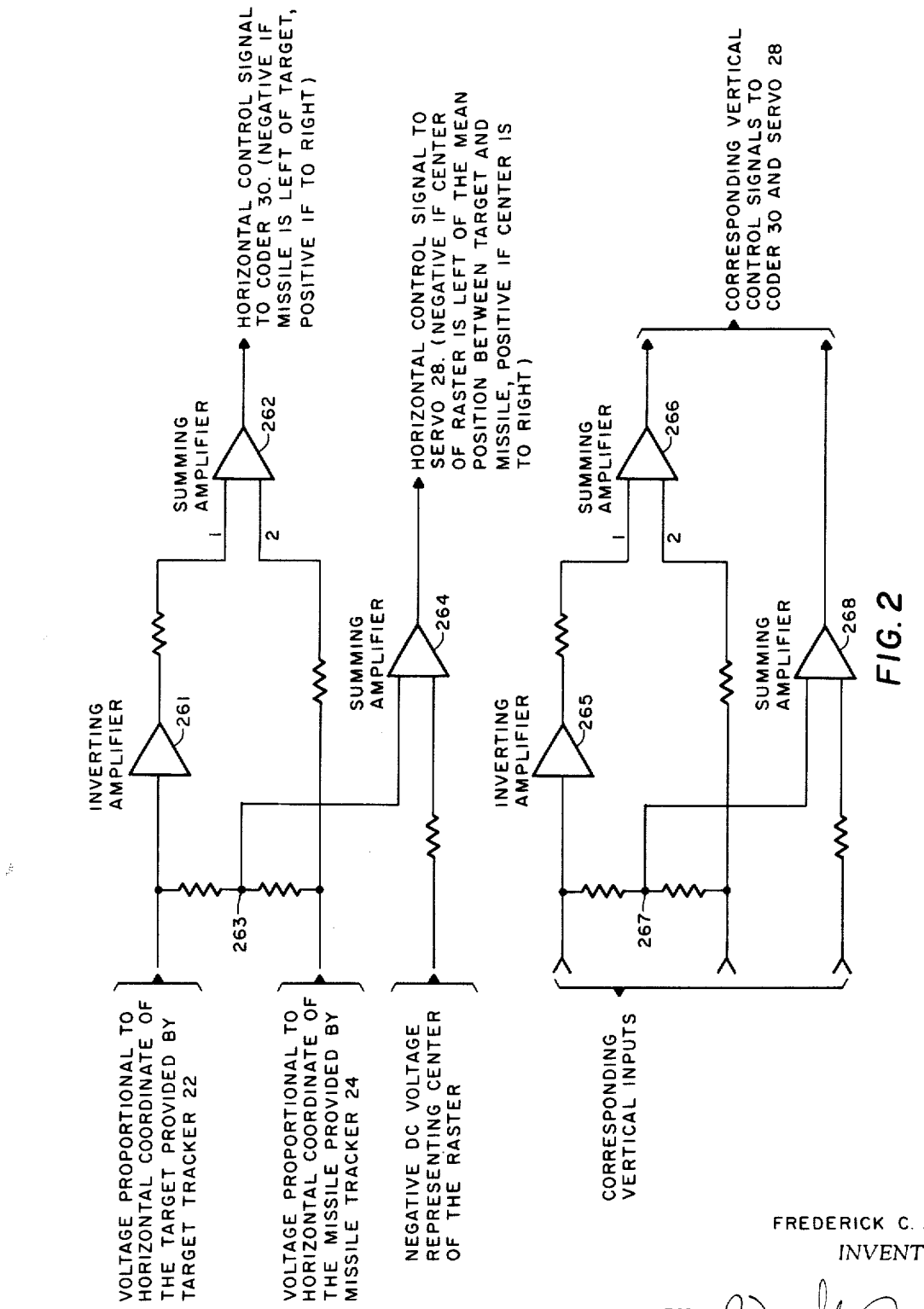
FIG. 2 shows one possible operational diagram for the computer shown in FIG. 1.

Output voltages from target tracking circuit 22, which are proportional to the horizontal and vertical coordinates of target, T, as it appears within the image view, are fed into computer 26. Also the same information with respect to missile, M, is fed from missile tracking circuit 24 into computer 26. Computer 26 will typically be a digital computer or digital differential analyzer type computer that is supplied with the aircraft and used for various navigation and weapons control purposes. However, for purposes of this description, computer 26 may be considered to be the simple analog computer diagrammed in FIG. 2. In FIG. 2, a voltage indicative of the horizontal position of the target in the raster is first inverted by inverting amplifier 261 and is then compared in summing amplifier 262 with a voltage indicative of the missile position in the raster. By well known analog computing theory, this yields a horizontal control signal for coder 30 which is indicative of the direction and amount by which the missile is horizontally out of line with the target. Also, a voltage indicative of the mean between the horizontal coordinates of the target and the missile is derived through the use of a resistor network at circuit point 263, and this is compared in summing amplifier 264 with a voltage indicative of the center position of the raster. Summing amplifier 264 therefore yields an output control signal for servo 28 which is indicative of the direction and amount by which the center of the raster is horizontally displaced from the mean position between the target and the missile. A duplicate set of computing elements (including inverting amplifier 265 and summing amplifiers 266 and 268) supply corresponding control signals for the vertical plane. Computer 26 is thereby able to supply both positioning signals to servo unit 28 and missile directing signals to coder unit 30. The positioning signal supplied to servo unit 28 is a signal which directs servo unit 28 to drive imaging system 10 so as to retain missile, M, and target, T, as near to center axis, CX, of the field of view as possible. Because the signals that are used relate only to the target and missile and not to the aircraft axis, servo unit 28 also drives imaging system 10 to retain target, T, and missile, M, in the field of view as the aircraft moves in relation to the target and missile.

The output signal from coder 30 modulates transmitter 32 to transmit a command signal to missile, M, to correct its flight line toward intersection with target, T. Since no means are provided for measuring range, this involves bringing line CM of the missile into superposition with line CT of the target. The missile command signals from computer 26 are coded by coder unit 30 to provide the command information in a form which can be interpreted by corresponding decoder circuitry in the missile and which can maintain the necessary degree of security from interfering signals or enemy countermeasures. Specifically, coder unit 30 and transmitter 32 may be the same type units as those used to code and transmit the manually initiated control signals in the existing missile system described in the Description of Prior Art above.

In a typical attack situation, imaging system 10 would be initially directed to point toward a chosen target, and target tracking would be initiated by techniques described in my above referenced co-pending application. The missile would then be launched into the field of view of imaging system 10 and missile tracking would be initiated. Through action of computer 26 and the command guidance link from transmitter 32 to missile M, missile M would then be directed to align with line CT between imaging system 10 and target T, and would be retained on that line throughout the remainder of the flight until intersection with target T.

Figure 3:
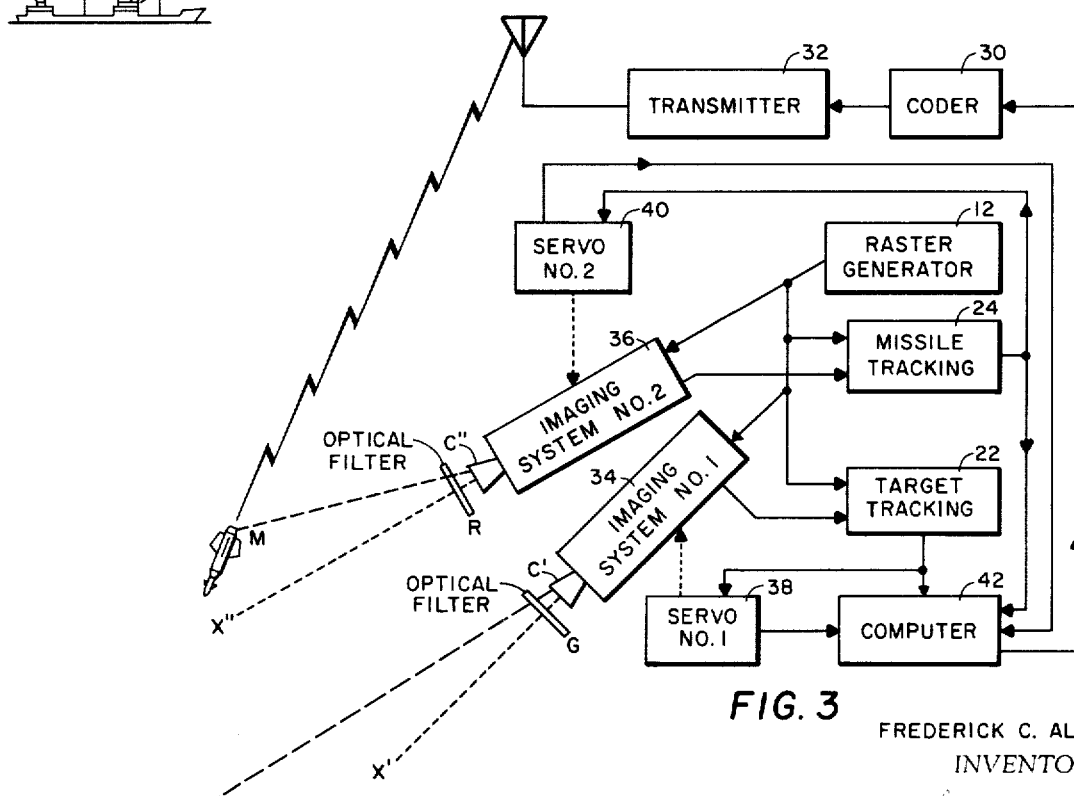
FIG. 3 is a block diagram of a first modification of the system shown in FIG. 1.

Referring to FIG. 3, there is shown a first alternate embodiment of the invention. Two separate imaging systems, 34 and 36, are utilized. Imaging system 34, which is preceded by an optical filter of color G that passes nearly all colors of light except that of the missile beacon or flare, provides video signals relating to target T, and imaging system 36, which is preceded by a filter of color R that passes only the color of the beacon or flare, provides signals relating to missile M. In this case raster generator 12 is connected to both imaging systems, 34 and 36, in order to provide the necessary raster voltages to each. In this embodiment the commutator circuit of FIG. 1 is not required and imaging system 34 provides video signals for target tracking circuit 22 while imaging system 36 provides signals for missile tracking circuits 24. The coordinate voltages derived by tracking circuits 22 and 24 are fed to servos 38 and 40 respectively and to computer 42. Servo 38 uses the horizontal and vertical target coordinates to correct the orientation of imaging system 34 so that the system axis C'X' is brought into line with target T, and similarly servo 40 uses missile coordinates from missile tracker 24 to bring imaging systems 36 axis C"X" into line with missile M. The missile and target coordinates which relate to their respective imaging system axes, together with information fed back from servos 38 and 40 which is indicative of the position of the respective imaging system axes relative to the aircraft, are all fed into computer 42. From this information computer 42 is able to determine the direction of missile M as related to the direction of target T from the location of imaging system 34 and 36, and to supply this information to coder 30 and transmitter 32, which act together to automatically command guide missile M toward target T in the same manner as described above in connection with FIG. 1. Computer 42, like computer 26 of FIG. 1, will typically be a navigation and weapons control computer that comes with the aircraft. However, for purposes of this description, it may be a simple analog computer similar to that diagrammed in FIG. 2. In the case of computer 42, the principal differences are, first, that the horizontal coordinate voltages from target tracking circuit 22 and servo 38 are summed in a resistor network before becoming the input to inverting amplifier 261, and similarly the horizontal coordinate voltages from missile tracking circuit 24 and servo 40 are summed before becoming the second input to summing amplifier 262. Second, a corresponding summing arrangement is used for vertical inputs. And third, circuit points 263 and 267 and summing amplifiers 264 and 268 are not required since there is no need for outputs from the computer to the respective servos. This arrangement computes control signals that continuously relate both target and missile coordinates to the aircraft axis and thereby bypass problems with time lags in servos 38 and 40.

Figure 4:
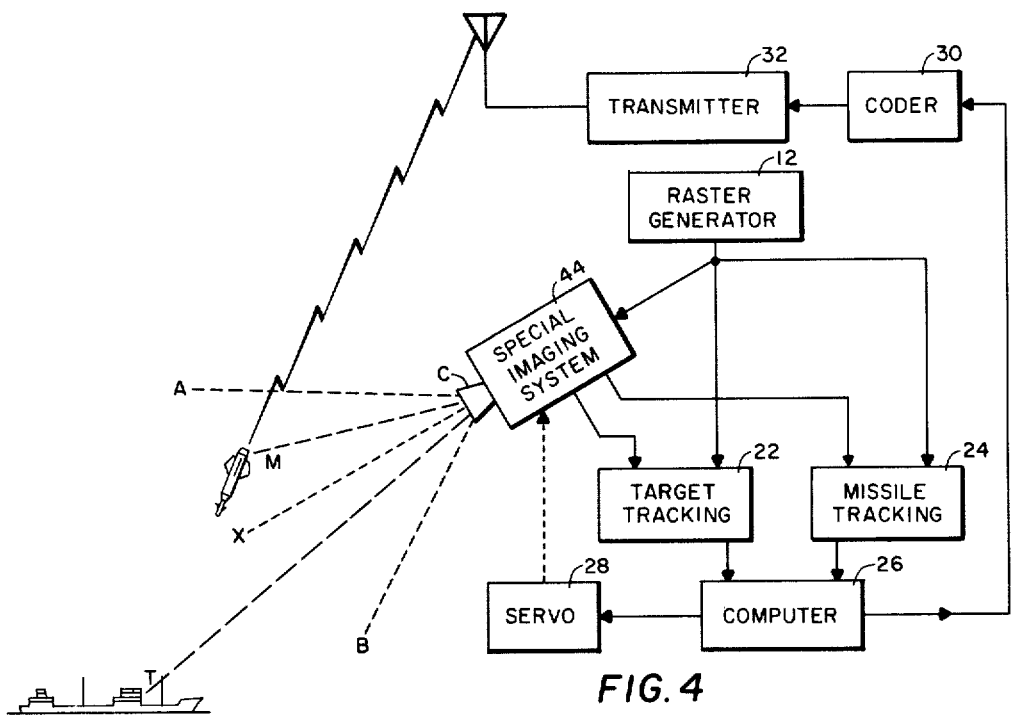
FIG. 4 is a block diagram of second modification of the system shown in FIG. 1.

Referring to FIG. 4, there is shown a second alternate embodiment of the invention. Here a special imaging system is directed generally toward the target T, and again a television-type video signal is derived as the resulting optical image is scanned under control of raster generator 12. By means which will be described in the following paragraph, this special imaging system is able to provide two video signals as outputs, one of which pertains to the target and other objects within field of view ACB but not to the missile beacon or flare, while the other pertains primarily to the beacon or flare. The signal pertaining to the target and other objects is fed to target tracking circuit 22, and that pertaining to the beacon or flare is fed to missile tracking circuit 24. In contrast with the system of FIG. 1, both video signals are supplied simultaneously. With the exception of this simultaneous rather than sequential action, tracking circuits 22 and 24 then provide target and missile coordinate information to computer 26, and the system functioning from this point on is the same as was described above in connection with FIG. 1.

Figure 5:
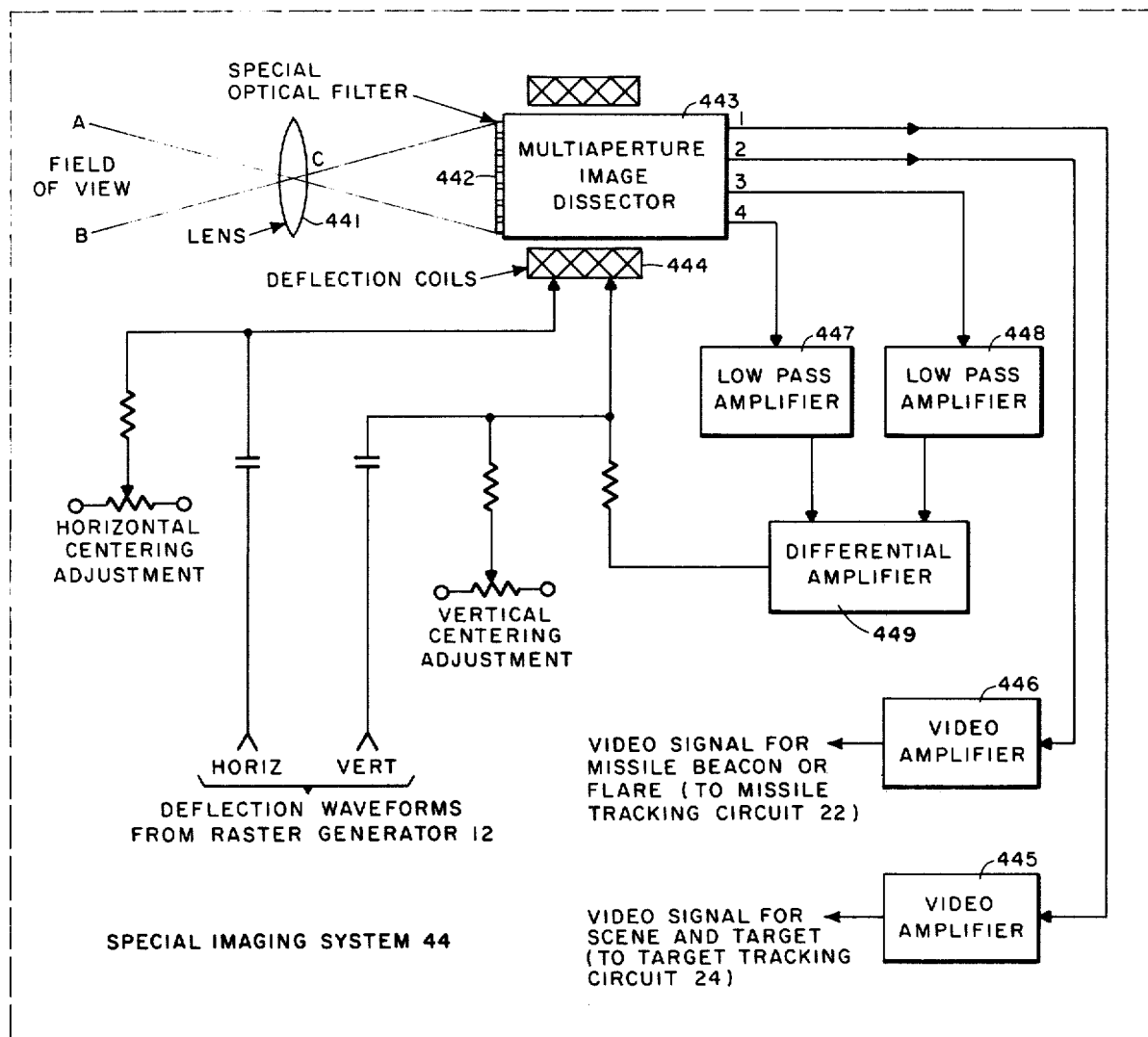
FIG. 5 is a block diagram for the special imaging the system shown in FIG. 4.
Figure 6A:
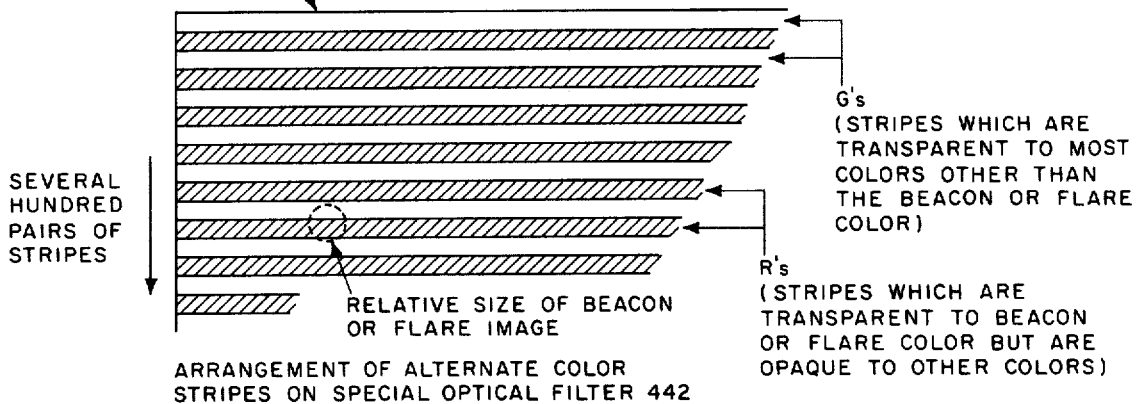
FIGS. 6A, 6B and 6C are sketches illustrating the optical filter and multi-aperture image dissector used in the special imaging system of FIG. 5.

A key step in the above operational process is the capability of special imaging system 44 to supply parallel-channel video signals relating to the target scene and to the missile beacon or flare respectively. This capability can be provided by use of a multi-aperture image dissector, or, if operation against targets at very low light level is desired, by use of an image dissecticon. A block diagram that shows special imaging system 44 configured with a multi-aperture image dissector is given in FIG. 5. Here, an optical image of objects within angle ACB is focused by lens 441 on the face plate of multi-aperture image dissector 443. However, just in front of the face plate and essentially in the plane of focus is located special optical filter 442. As is partially illustrated in FIG. 6A, filter 442 comprises on the order of several hundred pairs of stripes of alternate colors, with one color, G, of each pair being transparent to most of the natural light reflected from the target scene but not to the selective spectral radiation from the missile beacon or flare, and the other color, R, being essentially transparent only to the radiation from the beacon or flare. The individual stripes in the filter are each made approximately one dissector resolution element in width, and all are oriented parallel to the direction of the horizontal scan in the dissector. The length of each stripe should equal or exceed the width of the dissector raster, as established by raster generator 12, and the number of pairs of stripes should equal the number of scan lines in the raster. (Having the length of the stripes exceed the width of the raster relaxes tolerances on both the width and the horizontal centering of the raster.) Depending upon the spectral characteristics of the beacon or flare, a filter of this type can be constructed by color film processing techniques or by thin film-/etching techniques such as are used in microcircuit devices.

Figure 6B:
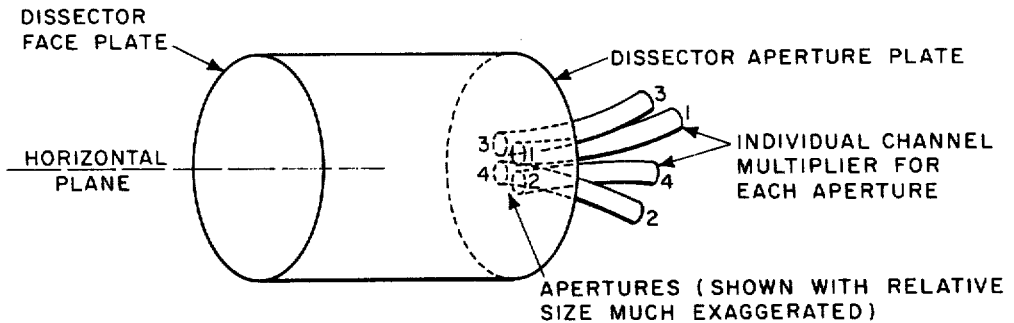

At the rear of image dissector 443, the deflection signals from raster generator 12 cause the composite electron image of the target scene and missile beacon or flare to be scanned past a skewed diamond-shaped arrangement of four apertures such as the apertures identified by the numbers 1,2,3,4 in FIG. 6B. The essence of the imaging system operation at this point is to cause the electrons entering aperture No. 1 to be those associated with a given primarily clear stripe $G_n$ in the filter as the image is scanned, while the electrons entering aperture No. 2 are those associated with a spectrally selective stripe $R_n$ just beneath the given clear stripe. Then, as the scanning of the raster proceeds downward, the next pair of G and R stripes become $G_n$ and $R_n$, and so on in turn until the raster is complete and all stripes are scanned. To be sure that the image of the essentially point-source beacon or flare does not happen to fall wholly on a clear stripe filter area and thus fail to appear and be detected on a spectrally selective stripe as is the intention in this sorting process, the beacon/-flare signal can be slightly defocused optically to increase its relative size to that shown in FIG. 6A. (This may come about by natural chromatic aberation if a near infrared or ultraviolet beacon is used with a lens designed primarily for visible light.) Thus in the overall operation, amplification of a primarily clear stripe signal in channel multiplier No. 1 of dissector 443 and further amplification in associated video amplifier 445 will lead to a video signal output that is associated primarily with the target scene, and similar amplification in channel multiplier No. 2 and associated video amplifier 446 will yield a video output that pertains only to the signal from the missile. As was indicated previously, these two video signals, which result from the same composite image and same scanning operation, may then be utilized in tracking circuits 22 and 24 to derive target and missile coordinate data. This arrangement will not incur any significant boresight misalignment between the two channels since (a) the same lens (441) and imaging tube (443) are used to view the target and missile, (b) the same raster generator (12) is used to develop the parallel-channel video signals, and (c) the same scan wave forms can be used in tracking circuits 22 and 24 to derive the output coordinate data for the target T and missile M respectively. The only inherent misalignment is that due to the small vertical offset between the No. 1 and No. 2 apertures, but this is a fixed offset and is readily compensated by a small fixed electronic bias. Equality of the respective target and missile coordinates will then assure that the missile direction ($\overline{CM}$) will indeed be coincident with that of the target ($\overline{CT}$).

Figure 6C:
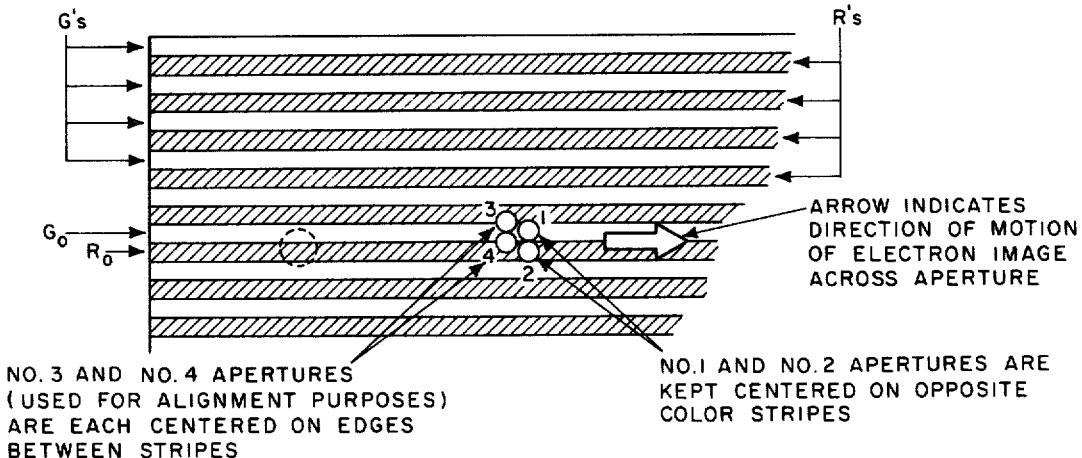

To maintain the electron image that reaches the aperture plate of dissector 443 in a vertical alignment such that signals from a clear stripe $G_n$ enter aperture No. 1 while the signal from the adjacent spectrally selective stripe $R_n$ enters aperture No. 2, signals derived from apertures No. 3 and 4 are utilized. This operation is illustrated in FIG. 6C and is shown diagrammatically in the right center portion of FIG. 5. Apertures 3 and 4 lead via their respective channel multipliers to low-pass amplifiers 447 and 448. These amplifiers respond to the prolonged presence of at least a detectable level of signal that is generally associated with scanning along a clear stripe, but they have negligible response to the short duration beacon or flare signal, which only appears on the spectrally selective stripes and then only at one or two (due to possible vertical overlap) points per scanning raster. If the electron image is positioned so that apertures 3 and 4 are each vertically aligned to receive their respective halves of the image signal from the given clear stripe $G_n$ as is shown in FIG. 6C, low-pass amplifiers 447 and 448 will have equal outputs, and differential amplifier 449, which follows, will have an output null. If, however, the scanning raster is imperfectly aligned to optical filter 442 or for some reason tends to drift out of vertical alignment so that the electron image of clear stripe $G_n$ moves upward with respect to the center point between apertures 3 and 4, aperture No. 3 will receive more electrons than No. 4, the low-pass amplifier outputs will differ, and an amplified correction signal will be fed back from differential amplifier 449 to lower the vertical centering of the raster slightly and restore the clear stripe electron image to very near its proper position. Conversely, an imbalance in favor of aperture No. 4 will result in an amplified signal to raise the raster and restore the desired alignment. Since apertures 1 and 2 are fixed in location with respect to 3 and 4, the corrections via the 3 and 4 feedbacks automatically keep both 1 and 2 in the proper alignment.

The interlacing of clear and spectrally selective stripes on filter 442 as described above results in a decrease in the total amount of target-related video signal available from dissector 443 since portions of the target optical image will generally be filtered out by the spectrally selective stripes. This may require the use of a telephoto lens as element 441 so that the target image is magnified at least enough that it cannot be totally hidden behind a single opaque stripe. With its narrow field of view, however, a telephoto lens may lead to difficulties in launching the missile so as to bring it initially within the field of view in order that tracking of the beacon or flare can commence. To avoid such difficulties, a two-lens arrangement can be used in place of single lens 441 during the acquisition phase, with a telephoto lens being used to project an image of the target scene and a wide angle lens to project an image of the beacon or flare simultaneously on the dissector 443 face plate. Later, when computed commands have brought the missile to the approximate center of the wide angle field of view and within the telephoto field of view, the wide angle lens can be optically disengaged and the single telephoto lens used from that time on.

Figure 7A:
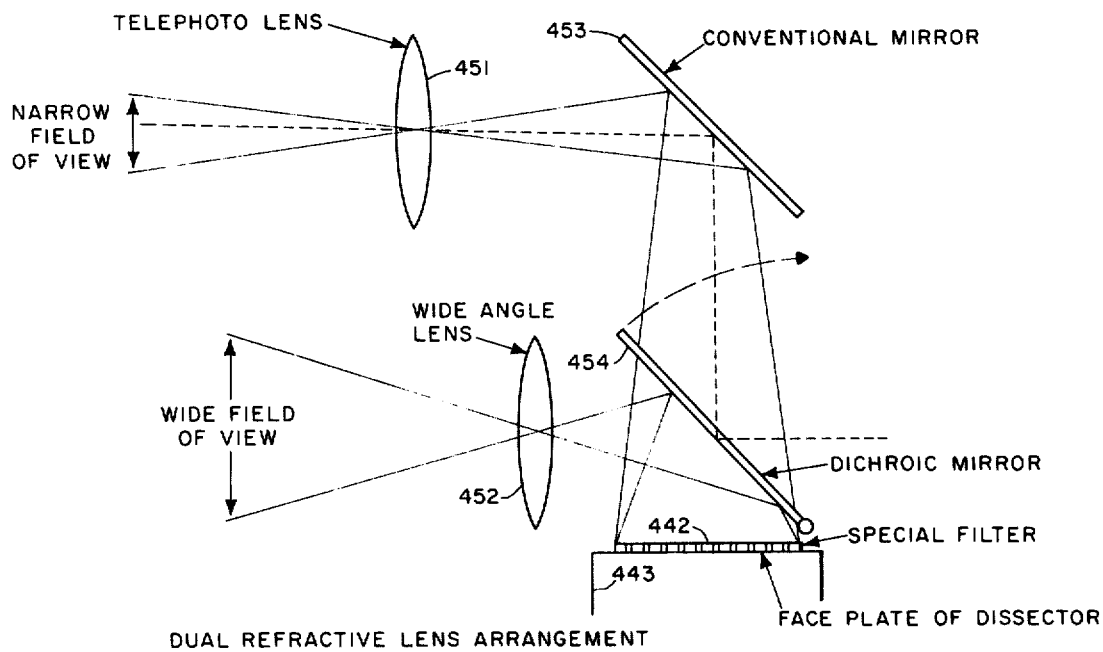
FIGS. 7A and 7B show sketches of a preferred and an alternate lens arrangement for the special imaging system of FIG. 5.

Several possible means for using two lenses simultaneously are illustrated in FIG. 7. Both utilize dichroic mirrors which reflect radiation in the selected spectral region of the beacon or flare but are transparent to light at other wavelengths. In a preferred embodiment shown in FIG. 7A, light from the target scene always reaches dissector 443 via telephoto lens 451 and conventional mirror 453, while the missile beacon or flare signal initially arrives via wide angle lens 452 and dichroic mirror 454. As is shown by the dotted lines, any beacon or flare radiation arriving via telephoto lens 451 at this time is reflected off to one side by the rear surface of dichroic mirror 454, and is thereby discarded. Similarly, target image radiation from wide angle lens 452 is not reflected by dichroic mirror 454 and is therefore also discarded to the side. Later, when dichroic 454 mirror is pivoted away (see dashed-line arrow), both target and missile images are formed by telephoto lens 451 alone.

Figure 7B:
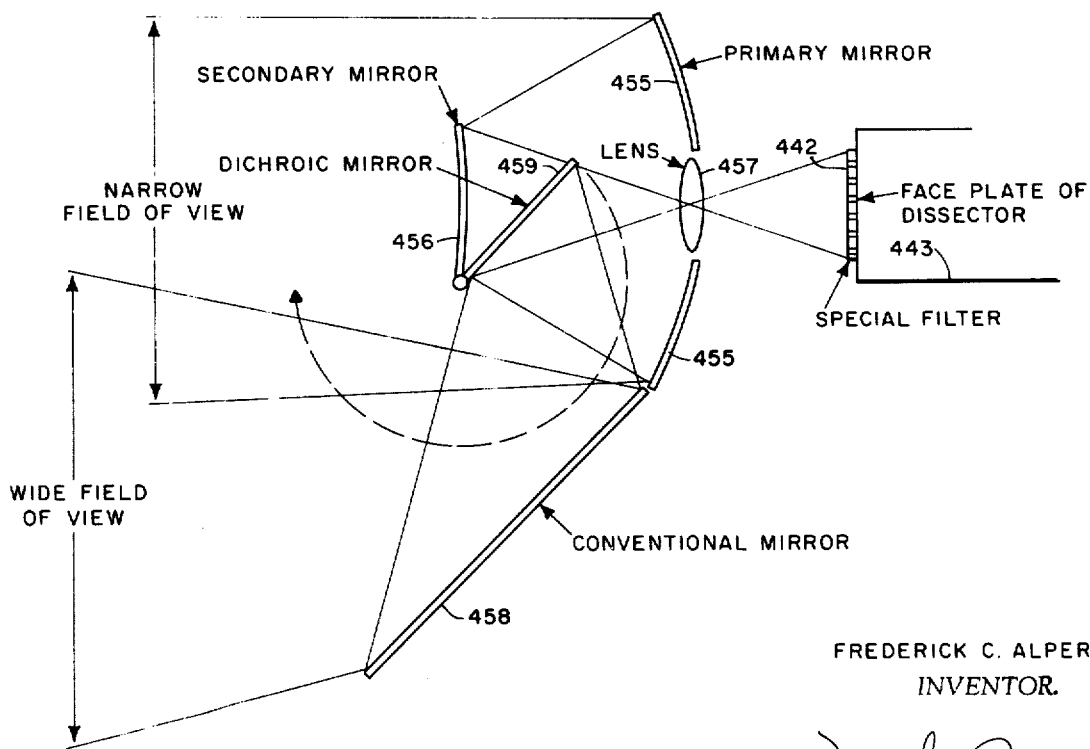

The alternate Cassegrainian two lens embodiment shown in FIG. 7B functions in a corresponding manner. In this case, primary mirror 455, secondary mirror 456, and objective lens 457 constitute a Cassegrainian telescope and focus an image of the target scene on special filter 442 and the face plate of dissector 443. In the telescope functioning, dichroic mirror 459 has no effect on most colors of light, but when it is in the position shown, it deflects upward (and therefore out of action) a beacon or flare radiation that is received via primary mirror 455 and secondary mirror 456. On the other hand, beacon or flare radiation received via conventional mirror 458 from a wide field of view is reflected by dichroic mirror 459 via lens 457 onto special filter 442 and the dissector 443 face plate, while other colors of light arriving via mirror 458 pass upward through dichroic mirror 459 and are not utilized. (If lens 457 is designed as an objective lens for the Cassegrainian system, it will not give a real sharp image of the beacon or flare radiation received via conventional mirror 458. This image can be improved by suitably curving dichroic mirror 459 and/or mirror 458. However, the focus in the arrangement shown will generally be adequate to serve until the missile can be brought within the narrow field of view.) This alternate embodiment therefore constitutes a lens arrangement similar to that described in connection with FIG. 7A; that is, a lens arrangement in which target scene information from a narrow field of view is focused on the dissector face plate simultaneously with a beacon or flare signal from a wide field of view. When dichroic mirror 459 is pivoted away from the above-described optical paths (by rotating it as shown by the dashed arrow), both target scene and missile beacon or flare radiation are received by the Cassegrainian telescope and conventional mirror 458 is not used.

Figure 8:
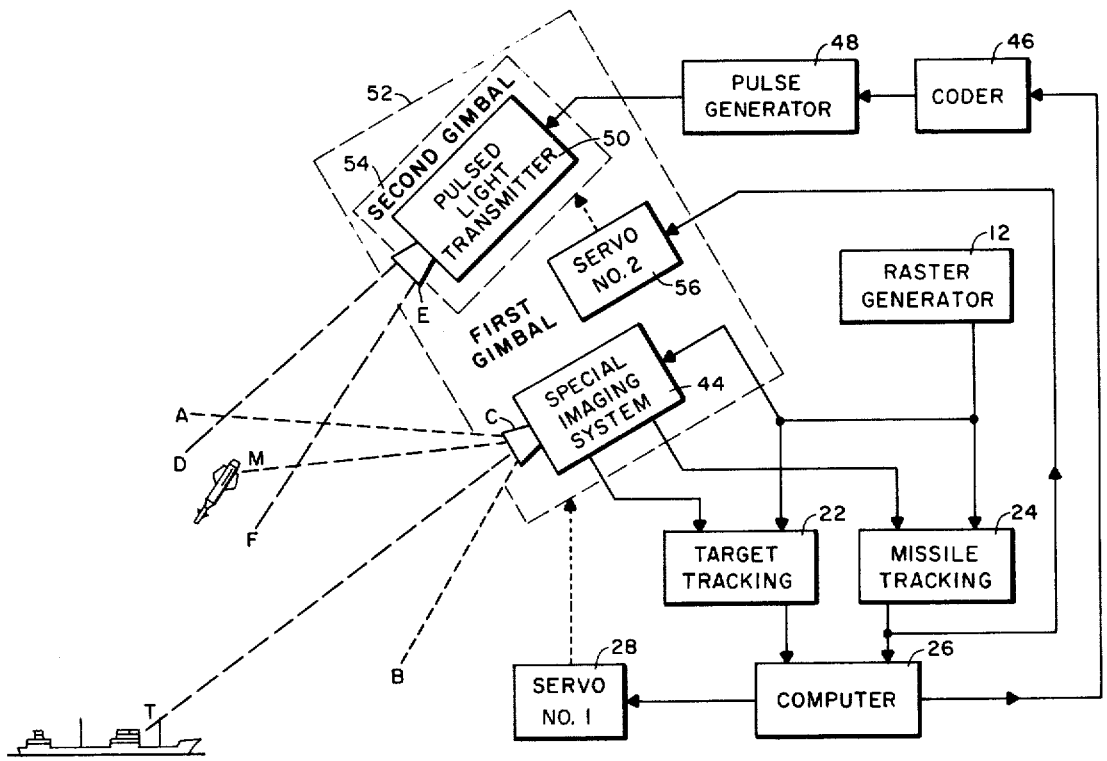
FIG. 8 is a block diagram of a third modification of the system shown in FIG. 1.

An optically based command guidance system of the type described in connection with FIGS. 1, 3 and 4 will have greater security against enemy countermeasures and will involve smaller size and lower cost missile components if an optical command transmission link is used in lieu of the radio link that is implemented by transmitter 32. Specifically, transmission of the commands by way of coded light pulses may be desirable since such pulses are readily generated, can readily be provided with the desired degree of directivity, and are readily distinguished from reflected sunlight or other potentially interfering signals. An automatic command guidance system block diagram that includes the elements of such an optical link is shown in FIG. 8, which presents a third alternate embodiment of the overall system. Here the necessary commands to the missile are computed and passed to a coder just as was done in the FIG. 4 configuration. (However, by replacing element 44 of FIG. 8 with elements 10, 14, 16, 18, and 20 of FIG. 1, the optical command transmission link can be adapted to the FIG. 1 embodiment. Similar arrangements to adapt the optical command transmission link to the FIG. 3 embodiment will be apparent after reading the following paragraphs.)

In the FIG. 8 embodiment, the missile control signals derived by computer 26 pass to coder 46 where they are coded in the form of various pulse repetition frequencies (PRF) or in a pulse delay modulation (PDM) format such as is used for certain telemetry applications. The low power PRF or PDM signals from coder 46 trigger pulse generator 48 which provides sufficient power to operate pulsed light transmitter 50. Transmitter 50 may consist of a flash tube with desired spectral characteristics, a reflector to direct the light output, and a lens for further beam sharpening. (Use of a laser in lieu of a flash tube is possible, but available lasers are less efficient and the ultra-narrow beam which they are capable of providing is not desired.

To keep the moderately narrow beam of pulsed light transmitter 50 directed toward the missile (angle DEF is typically on the order of 2°), second signal 54 and servo system 56 are used. Second gimbal 54 is mounted on the platform carried within first gimbal 52, which is the basic gimbal that carries imaging system 44 and is driven by servo 28. The mounting arrangement for transmitter 50 thus constitutes a gimbal on a gimbal. Second servo 56 therefore bases its operation the same angular reference system as imaging system 44, and missile tracking coordinates derived from line of sight $\overline{CM}$ can be used directly (without processing through the computer) as the input for centering angle DEF on the missile position. Since angle DEF is only moderately narrow, servo 56 need not be a very high precision device.

At the missile, the optical commands are received via a simple lens (ungimbaled), a suitable spectral filter, a photocell, a pulse amplifier, and a decoder. The lens serves to increase the reception aperture and to limit the angle from which commands can be received. The optical filter and pulse amplifier both aid in the rejection of sunlight and other undesired signals from spurious sources.

What is claimed is:

1. In an optical automatic command missile guidance system having tactical target capabilities, the combination comprising:
   a. television tracking circuit means for simultaneously viewing a target and a missile launched against said target and providing separate output voltages proportional to the horizontal and vertical coordinates of both said target and said missile, respectively,
   b. servo means coupled to said television tracking circuit means for retaining the target and missile in the field of view of said television tracking circuit means,
   c. computer means coupled to said tracking circuit means and to said servo means for providing output voltages proportional to the relative positions of said missile and target,
   d. and transmitter means coupled to said computer means for transmitting control signals to said missile to correct the flight line of said missile toward intersection with said target.

2. In an automatic command missile guidance system having tactical target capabilities, the combination comprising:
   a. an optical imaging system means for generating first and second output signals representing a target and a missile respectively when said target and said missile are in the field of view of said imaging system,
   b. a target tracking circuit for providing output voltages proportional to the horizontal and vertical coordinates of said target,
   c. a missile tracking circuit for providing output voltages proportional to the horizontal and vertical coordinates of said missile,
   d. said imaging system connected to said target and said missile tracking circuits for feeding said first and second output signals to said target and missile tracking circuits respectively,
   e. computer means coupled to said target and missile tracking circuits for producing an output voltage proportional to the relative positions of said target and said missile,
   f. servo command means coupled to said imaging system and to said computer for driving said imaging system to retain the missile and target in the field of view of said imaging system,
   g. and transmitter means coupled to said computer for transmitting command guidance signals to said missile to guide said missile to said target.

3. In an automatic command missile guidance system having tactical target capabilities, the combination comprising:
   a. an optical imaging system means for viewing simultaneously a target and a missile launched against said target and which supplies electronic signals containing information regarding the position of said target and said missile with respect to axes of orientation of said optical imaging system means,
   b. a target tracking circuit for providing output voltages proportional to the horizontal and vertical coordinates of said target,
   c. a missile tracking circuit for providing output voltages proportional to the horizontal and vertical coordinates of said missile,
   d. said optical imaging system means connected to said target and said missile circuits for coupling the electronic signal outputs containing position information of said target and said missile from said imaging system to said target and missile tracking circuits, respectively,
   e. computer circuit means coupled to said target and said missile tracking circuits for generating relative position signals proportional to the relative positions of said target and said missile respectively,
   f. servo means coupled to said imaging system means and to said computer and being responsive to the output signals from said computer to rotate said imaging system to retain the missile and target in the field of view of said imaging system, g. and transmitter means coupled to said computer for transmitting control signals to said missile to correct the flight line of said missile toward intersection with said target.

4. A guidance system as in claim 3 wherein said optical imaging system means comprises at least one television camera scanned with a conventional television-type raster to supply video type electronic signals containing information regarding the position of said target and said missile.

5. A system as in claim 3 wherein light filter means is provided for filtering light entering said imaging system means and comprising at least two segments, one segment of which is transparent to light radiation other than light transmitted from said missile to allow video signals to be generated relating to target position information and the other segment of which is opaque to colors other than light radiation from said missile to allow video signals to be generated relating to missile position information.

6. A missile guidance system as in claim 3, wherein said optical imaging system means includes commutator switch means connected to said imaging system and to said target and said missile tracking circuits for alternately coupling the output signals of said imaging system to said target and missile tracking circuits respectively.

7. A missile guidance system as in claim 3 wherein said optical imaging system means comprises:

a. a first imaging system for viewing said target, b. a second imaging system for viewing said missile launched against said target, c. said target tracking circuit coupled to said first imaging system for providing output voltages proportional to the horizontal and vertical coordinates of said target, d. said missile tracking circuit coupled to said second imaging system for providing output voltages proportional to the horizontal and vertical coordinates of said missile, e. said servo means comprising a first servo coupled to said first imaging system and to said target tracking circuit for rotating said first imaging system to retain the target on the center axis of the field of view of said imaging system, and a second servo coupled to said second imaging system and to said missile tracking circuit for rotating said second imaging system to retain the missile on the center axis of the field of view of said imaging system, f. said computer circuit means having inputs coupled to said target and missile tracking circuits.

8. A guidance system as in claim 3 wherein television-type video signal is derived as a result of scanning said optical image under control of a raster generator means to supply parallel-channel video signals relating to both target scene and to missile scene, respectively, using a multi-aperture image dissector.

9. A guidance system as in claim 3 wherein said transmitter means is an optical command transmission link using coded light pulses from a pulsed light transmitter, said pulsed light transmitter being gimballed to said imaging system means for keeping a narrow beam of light from said pulsed light transmitter directed toward said missile.

* * * * *